April 7, 1925.  1,532,974

J. J. ALBER ET AL

HANGER FOR DISPLAYING DRESSED POULTRY

Filed June 25, 1923

Joseph J. Alber,
Charles E. Dougherty,
INVENTORS

BY Victor J. Evans
ATTORNEY

WITNESS: Fred W. Ely

Patented Apr. 7, 1925.

1,532,974

UNITED STATES PATENT OFFICE.

JOSEPH J. ALBER AND CHARLES E. DOUGHERTY, OF BROOKLYN, NEW YORK.

HANGER FOR DISPLAYING DRESSED POULTRY.

Application filed June 25, 1923. Serial No. 647,703.

*To all whom it may concern:*

Be it known that we, JOSEPH J. ALBER and CHARLES E. DOUGHERTY, citizens of United States, residing at Brooklyn, in the county of Kings and State of New York, have invented new and useful Improvements in Hangers for Displaying Dressed Poultry, of which the following is a specification.

Our present invention pertains to devices for hanging poultry head downward for the display of poultry in markets and the like; and it has for its object to provide a poultry hanger of simple and inexpensive construction and one adapted for the ready engagement and disengagement of the legs of a fowl, and this without liability of either of the legs becoming casually disengaged from the hanger.

To the attainment of the foregoing, the invention consists in the improvement as hereinafter described and definitely claimed.

In the accompanying drawings, forming part of this specification,

Figure 2:
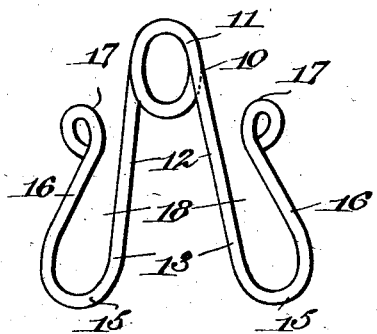
Figure 2 is a front elevational view.
Figure 1:
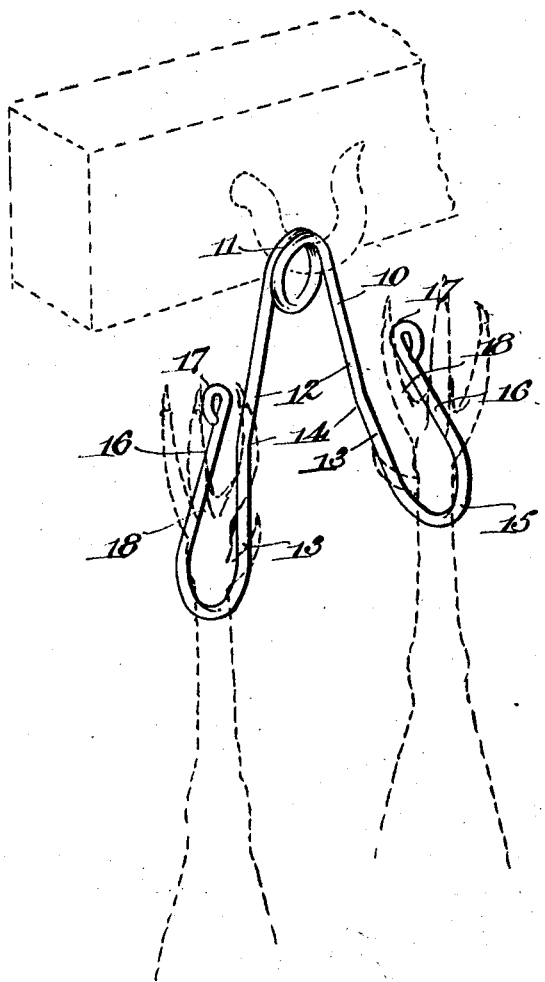
Figure 1 is a perspective view of our invention, showing a fowl supported thereby in dotted lines.
Figure 3:
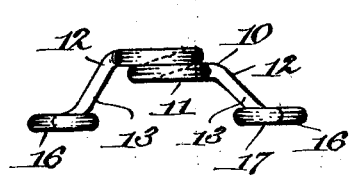
Figure 3 is an end elevation of the same.
Figure 4:
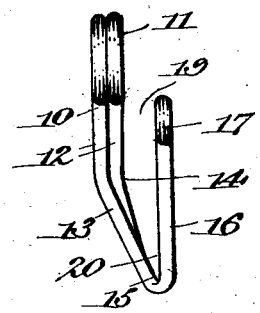
Figure 4 is a top plan view of the same.

Referring more particularly to the several views in the drawing, the reference numeral 10 designates a length of suitable material such as tempered or spring wire and from which our improved hanger is formed. The wire 10 is coiled at its medial point to form an oval eye 11 for permitting the holder to be supported by a hook or the like. The ends of the wire are brought downward in converging relation to each other to form legs 12, the portions 13 of which are bent forwardly as at 14, and are then looped to form bights 15 and upwardly extending arms 16. These arms 15 extend upwardly to a point slightly above the bend 14 of the legs, and have their ends bent upon themselves as at 17 to prevent scratching or tearing of the legs of the fowl when inserting the same into the holder. The portions 13 of the legs 12, the bights 15 and arms 16 define clamping jaws 18, the same having relatively narrow mouths 19 and wide bight portion 20 into which the legs of the fowl are to be inserted and held preferably at points immediately below the feed or immediately above the leg joints when the fowl is suspended head down. It will therefore be seen that we have provided a holder having offset jaws for receiving and gripping the legs of a fowl whereby the same may be hung in a vertical position and being easy of insertion or removal therefrom.

What is claimed as new is:—

As a new article of manufacture, a holder for suspended poultry having at its center a bight to rest on a hook or other support and also having legs pendent from said bight and spaced apart, and loops at the lower ends and outer sides of the said legs; the said loops inclined downwardly and forwardly from their respective legs; and arranged with their bights below and spaced from the legs and their outer arms inclined upwardly and inwardly whereby the mouths of the loops are narrower than the bight portions thereof, the said arms terminating in eyes disposed at the outer sides of the mouths of the said loops.

In testimony whereof we have affixed our signatures.

JOSEPH J. ALBER.
CHARLES E. DOUGHERTY.